US012405996B2

(12) United States Patent
Kilari et al.

(10) Patent No.: US 12,405,996 B2
(45) Date of Patent: Sep. 2, 2025

(54) AUTOMATIC SUGGESTION OF MOST INFORMATIVE IMAGES

(71) Applicant: Quizlet, Inc., San Francisco, CA (US)

(72) Inventors: Murali krishna teja Kilari, San Francisco, CA (US); Jeffrey James, Denver, CO (US); Madeline Gilbert, San Francisco, CA (US)

(73) Assignee: Quizlet, Inc., San Francisco, CA (US)

( * ) Notice: Subject to any disclaimer, the term of this patent is extended or adjusted under 35 U.S.C. 154(b) by 0 days.

(21) Appl. No.: 18/789,456

(22) Filed: Jul. 30, 2024

(65) Prior Publication Data
US 2025/0053593 A1    Feb. 13, 2025

Related U.S. Application Data

(60) Provisional application No. 63/518,767, filed on Aug. 10, 2023.

(51) Int. Cl.
*G06F 16/535* (2019.01)
*G06F 16/538* (2019.01)
*G06N 3/08* (2023.01)

(52) U.S. Cl.
CPC ......... *G06F 16/535* (2019.01); *G06F 16/538* (2019.01); *G06N 3/08* (2013.01)

(58) Field of Classification Search
CPC ....... G06F 16/535; G06F 16/538; G06N 3/08; G06N 3/045; G06N 3/084
See application file for complete search history.

(56) References Cited

U.S. PATENT DOCUMENTS

2020/0311798 A1 * 10/2020 Forsyth .............. G06Q 30/0643
2022/0198671 A1 *  6/2022 Price ........................ G06N 3/08
(Continued)

FOREIGN PATENT DOCUMENTS

WO    WO-2023154385 A1 *  8/2023    ........... G06F 16/316

OTHER PUBLICATIONS

Rishi Bommasani, et al, "On the Opportunities and Risks of Foundation Models," arXiv:2108.07258v3, web retrieval https://doi.org/10.48550/arXiv.2108.07258, Jul. 12, 2022, 214 pages.

(Continued)

*Primary Examiner* — Angelica Ruiz
(74) *Attorney, Agent, or Firm* — Baker Botts L.L.P.

(57) ABSTRACT

In one embodiment, a computer-implemented method can use a server computer to obtain from a client computer a text input in a query from a user and access in digital data storage coupled to the server computer a plurality of digital images. The computer-implemented method can train a deep learning model to determine a first embedding for the text input and a second embedding of each of the plurality of images. The computer-implemented method can identify one or more relevant images based on a respective similarity of the first embedding to the second embedding. The computer-implemented method can determine image informativeness and confidence scores for information terms of each of the one or more relevant images. The computer-implemented method can transmit to the client computer in response to obtaining the text input, instructions for presenting a user interface comprising the one or more relevant images and the confidence scores.

20 Claims, 13 Drawing Sheets

(56) References Cited

U.S. PATENT DOCUMENTS

| | | |
|---|---|---|
| 2022/0263877 A1 | 8/2022 | Conlin et al. |
| 2022/0319181 A1 | 10/2022 | Kanuganti et al. |
| 2022/0406210 A1 | 12/2022 | Lopes Do Nascimento Filho et al. |
| 2023/0135179 A1 | 5/2023 | Mielke et al. |
| 2023/0418861 A1* | 12/2023 | Zhang .................. G06F 16/535 |

OTHER PUBLICATIONS

Chengsi Liang, et al, "Generative AI-driven Semantic Communication Networks: Architecture, Technologies and Applications," arXiv:2401.00124v2, web retrieval https://doi.org/10.48550/arXiv.2401.00124, Jan. 7, 2024, 20 pages.

Zhijin Qin, et al, "Semantic Communications: Principles and Challenges," arXiv:2201.01389v5, web retrieval https://doi.org/10.48550/arXiv.2201.01389, Jun. 27, 2022, 32 pages.

* cited by examiner

*FIG. 6A*

AUTOMATIC SUGGESTION OF MOST INFORMATIVE IMAGES

BENEFIT CLAIM

This application claims the benefit under 35 U.S.C. § 119 (e) of provisional application 63/518,767, filed Aug. 10, 2023, the entire contents of which are hereby incorporated by reference for all purposes as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. @ 2022-2023 Quizlet, Inc.

TECHNICAL FIELD

One technical field of the present disclosure is computer-implemented artificial intelligence using programmed models to solve an automated text distractor task. Another technical field is machine learning model development, training, deployment, and operationalization. Another technical field is the incorporation of ranking of image informativeness into machine learning models.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Traditional online learning systems have made targeted instructions for students in a wide variety of subjects and learning modes more accessible than ever before. Outside of traditional educational institutions, diverse groups of users spread across the globe can learn almost anything without ever setting foot in a classroom. The learning modes can be a flashcard mode, a learn and write mode, or a test mode. For example, the users can apply a learn-and-write mode which includes a personalized study plan to study multiple choice questions (MCQs) based on their familiarity with a set's content and advance the education from easy to complex questions. As another example, users can apply a flashcard or test mode to test knowledge with flashcards and review terms and definitions of a text word in a flashcard.

As a result, various learning modes collectively provide expert solutions to help users through step-by-step questions. Users can quickly understand the reasons behind the right answer during the learning process and apply the knowledge in future studies.

Traditional learning modes may use definitions in the form of side text to design MCQs and answers for a flashcard. However, combining the definition side text of MCQs and images in answers for different learning modes may be more effective because the images are more straightforward than the definition side text. Therefore, automated learning support systems could benefit from having an automated text distractor that helps to answer or supplement an MCQ with one or more relevant images which are semantically similar to a word and/or a definition for the MCQ. The automated text distractor may provide an efficient solution to establish visual information of various MCQs and evaluate various learning modes to have a better impact on learning, business communication, and memory recall for the users.

Furthermore, users can have many channels to receive educational information, including text and visual information. Visual information can be processed much faster than the corresponding text information because visual information is easy to remember and understand. Users struggling with information overload may benefit from visual learning rather than pure text. Access to visual information may help users advance their education based on MCQs more efficiently. Likewise, the necessary visual information can be categorized in many levels based on subject, count, sensitivity, informativeness, etc. Based on the foregoing, the referenced technical fields have developed an acute need for better ways to help the users to assess visual information in their education process using a flashcard in the education management system for better communication. Automated learning support systems could benefit from an automated text that can efficiently obtain necessary relevant images based on input text information from a word and/or a definition in a flashcard.

SUMMARY

The appended claims may serve as a summary of the invention.

BRIEF DESCRIPTION OF THE DRAWINGS

In the drawings:

FIG. 6A shows an example of text input in a flashcard in accordance with one or more embodiments.

DETAILED DESCRIPTION

Figure 1:
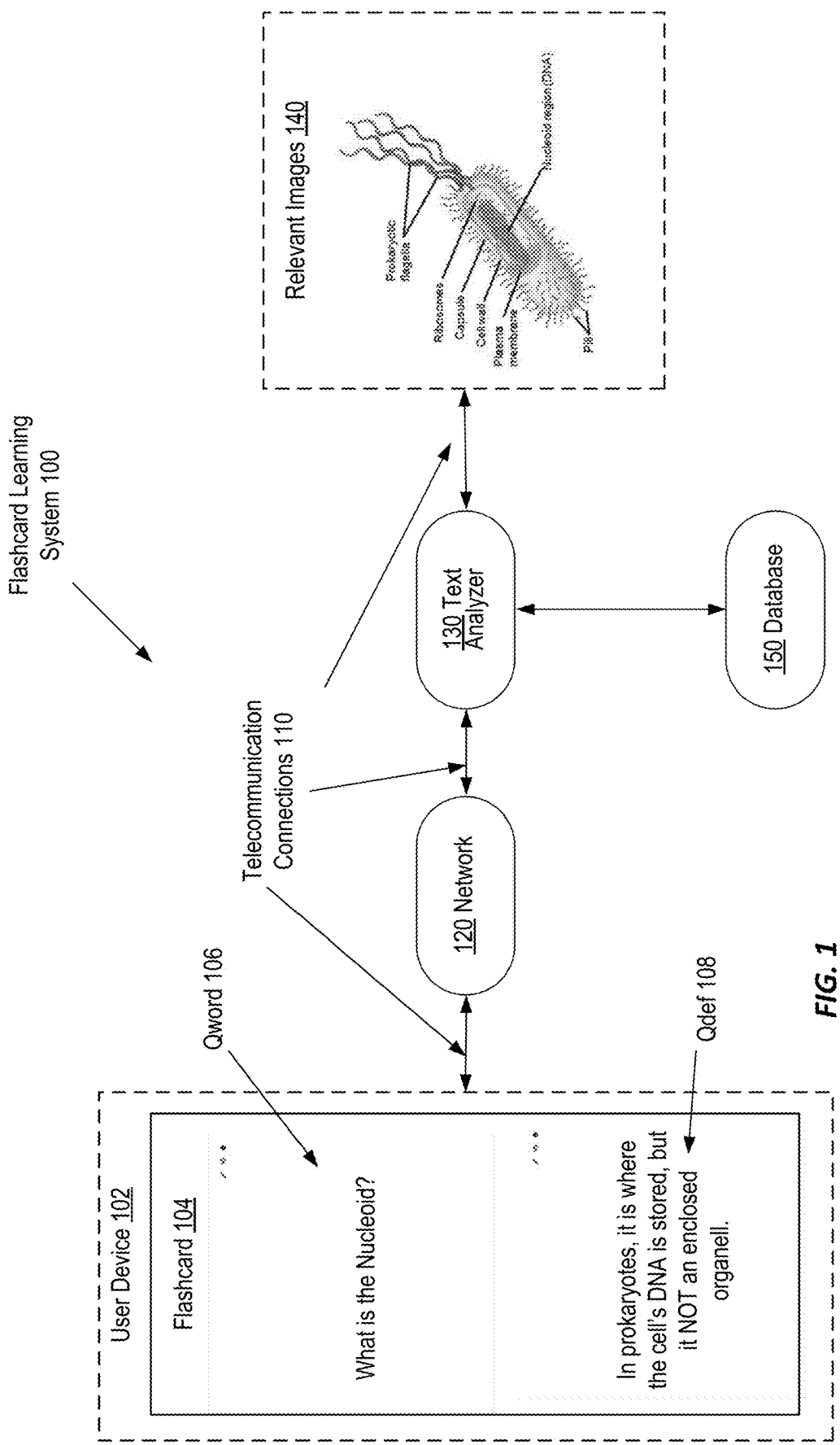
FIG. 1 shows a flashcard mode system using a text analyzer in accordance with one or more embodiments.

In the following description, for the purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized, and structural, logical, software, electrical, and other changes may be made without departing from the scope of the embodiments that are specifically described. Various modifications and alterations are possible and expected. Some features of one or more of the inventions may be described with reference to one or more embodiments or drawing figures, but such features are not limited to usage in the one or more embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis for interpreting the claims. Devices that are described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate various possible embodiments and to illustrate one or more aspects of the inventions more fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in each embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

Embodiments are described in the sections below according to the following outline:
1. GENERAL OVERVIEW
2. STRUCTURAL AND FUNCTIONAL OVERVIEW
   2.1 DISTRIBUTED COMPUTER SYSTEM EXAMPLE
   2.2 TRAINING MACHINE LEARNING MODELS
      2.2.1 A DUAL ENCODER
      2.2.2 A CONTRASTIVE LOSS FUNCTION
      2.2.3 A TRIPLET LOSS FUNCTION
   2.3 EXAMPLE DATA PROCESSING FLOW
3. PROCEDURAL OVERVIEW
4. IMPLEMENTATION EXAMPLE
5. HARDWARE OVERVIEW 1. General Overview The disclosure encompasses the subject matter of the following numbered clauses:

1. A computer-implemented method comprising: using a server computer, obtaining from a client computer a text input comprising one or more first unigrams in a query from a user; accessing in digital data storage coupled to the server computer a plurality of digital images, each of the plurality of digital images comprising one or more definition unigrams; training a deep learning model to map the one or more first unigrams to first vector representations for the text input and to map the one or more definition unigrams to second vector representations for the plurality of digital images, the deep learning model being a dual encoder model comprising a text encoder and an image encoder based on a ranking loss function; determining, using the deep learning model, the first vector representations of the text input by mapping the one or more first unigrams of the text input to the first vector representations for the text input; determining, using the deep learning model, a first embedding of the first vector representations of the text input in a multi-dimensional embedding space based on a combination of the first vector representations of the text input; determining, using the deep learning model, the second vector representations of each of the plurality of digital images by mapping the one or more definition unigrams of each of the plurality of digital images to the second vector representations for the plurality of digital images; determining, using the deep learning model, a second embedding of the second vector representations of each of the plurality of digital images in the multi-dimensional embedding space based on a combination of the second vector representations of a corresponding image; identifying one or more relevant images based on a respective similarity of the first embedding to the second embedding; determining one or more information terms for each of the one or more relevant images, an image informativeness value for each of the one or more relevant images based on the one or more information terms, and a confidence score for each of the one or more information terms; and transmitting, to the client computer in response to obtaining the text input, instructions for presenting a user interface comprising the one or more relevant images and the confidence score for each of the one or more information terms for each of the one or more relevant images.

2. The computer-implemented method of clause 1, wherein the text input includes a word side text.

3. The computer-implemented method of clause 2, wherein the text input includes at least one definition side associated with the word side text.

4. The computer-implemented method of clause 1, further comprising applying a machine learning algorithm and a negative data iterative training algorithm to train the deep learning model, wherein the machine learning algorithm uses a dual encoder which includes the text encoder and the image encoder.

5. The computer-implemented method of clause 1, wherein the ranking loss function is one selected from a group consisting of a triplet loss function and a contrastive loss function.

6. The computer-implemented method of clause 1, further comprising: averaging the first vector representations of the text input to determine the first embedding of the first vector representations of the text input in the multi-dimensional embedding space; and averaging the second vector representations of each of the plurality of digital images to determine the second embedding of the second vector representations of the corresponding image in the multi-dimensional embedding space.

7. The computer-implemented method of clause 1, further comprising: determining coordinates for one or more bounding boxes corresponding to text regions for each of the one or more relevant images; determining a text content within each of the one or more bounding boxes based on the coordinates for each of the one or more bounding boxes; and applying spelling correction to the text content within each of the one or more bounding boxes.

8. The computer-implemented method of clause 1, further comprising identifying a high informative image from the one or more relevant images using the image informativeness value for each of the one or more relevant images and identifying a low informative image from the one or more relevant images using the image informativeness value for each of the one or more relevant images.

9. The computer-implemented method of clause 8, wherein the high informative image from the one or more relevant images is defined as one of the one or more relevant images with a most number of words and below a predetermined word limit.

10. The computer-implemented method of clause 8, wherein the low informative image from the one or more relevant images is defined as one of the one or more relevant images with a least number of words and below a predetermined word limit.

In an embodiment, a computer-implemented method can be programmed for an automated text distractor to determine one or more relevant images and image informativeness for each of the one or more relevant images using an input text in a flashcard for a user of interest. The input text can be a Qword, a Qdef, or a Qterm in a flashcard. For example, a Qword includes a word side text of the flashcard. A Qdef includes a definition side text of the flashcard. A Qterm is a concatenation of a Qword and a Qdef to include both the word side and definition side text of the flashcard. As a result, given a Qword, a Qdef, or a Qterm in a flashcard, the automated text distractor can train a model using a machine learning algorithm to find one or more images that are semantically relevant to the input text. For example, a user is interested in learning a nucleoid which is an irregularly shaped region within a prokaryotic cell that contains all or most of the genetic materials. The user can apply the automated text distractor to identify one or more semantically similar images based on an input text associated with the term nucleoid. Based on the input text input, the automated text distractor can determine an embedding vector of the input text and embedding vectors for a plurality of images stored in a database. As a result, the automated text distractor can search for one or more images whose embedding vectors match the embedding vector of the input text under a predetermined criterion.

The computer-implemented method can determine rankings of one or more relevant images by their image informativeness based on how many words are in the images. The computer-implemented method can apply text detection, text recognition, and spelling correction to predict text information within one or more relevant images. For example, the text information can be evaluated to generate rankings of one or more images from low image informativeness to high image informativeness. As another example, the text information can be useful to calculate a confidence score for each text term in the test information of the relevant images based on the input text input. In some embodiments, the computer-implemented method can be performed in a waterfall approach to send only low confidence images to the user as suggestions to the user to potentially increase the chances of an answer being correct next time after an incorrect answer to a question by the user.

2. Structural and Functional Overview 2.1 Distributed Computer System Example

Figure 2:
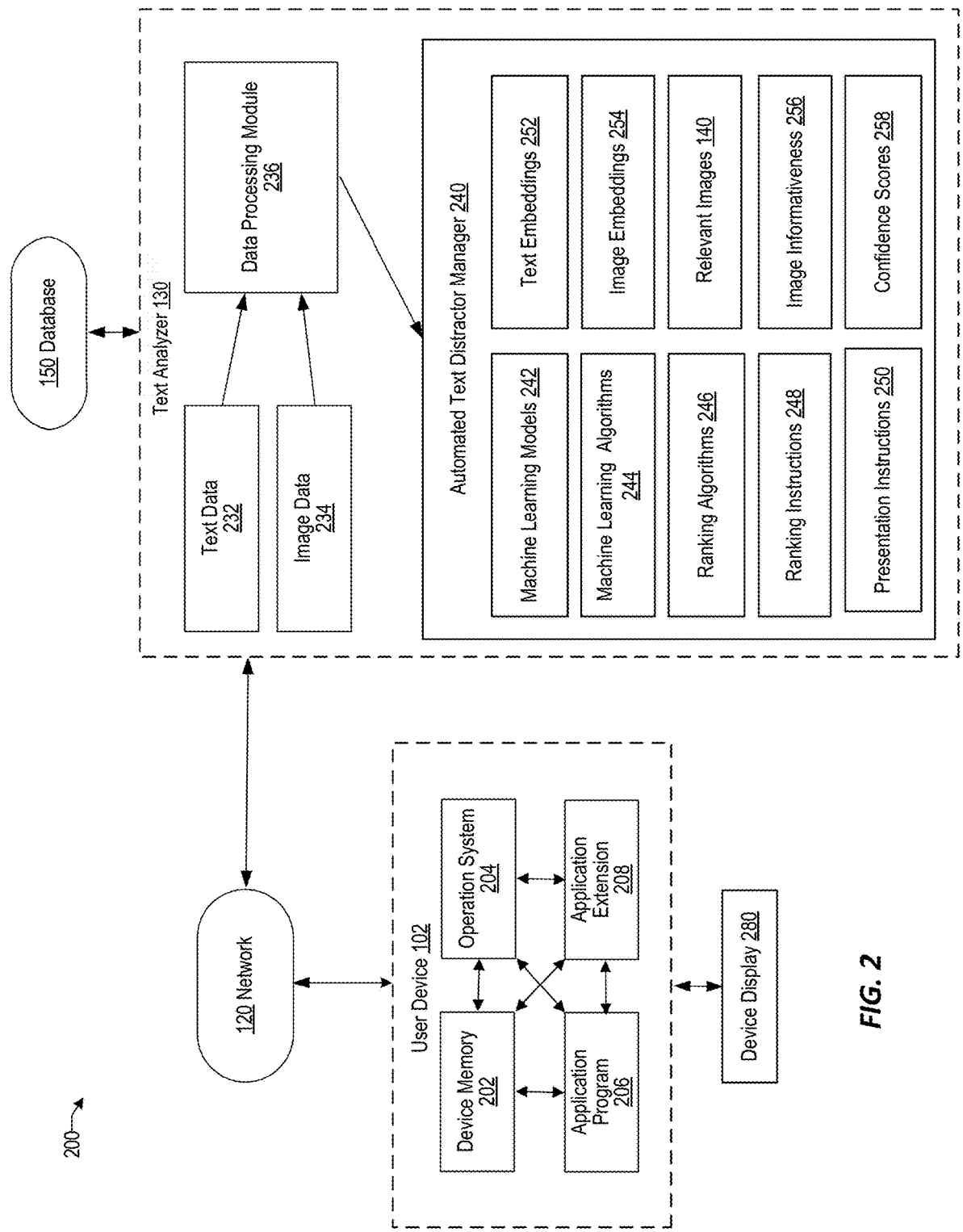
FIG. 2 shows an example of an automated text analyzer using one or more machine learning algorithms to determine one or more relevant images for an input text in a flashcard in accordance with one or more embodiments.

FIG. 1 shows a flashcard mode system using a text analyzer in accordance with one or more embodiments. FIG. 2 shows an example of an automated text analyzer 130 using one or more machine learning algorithms to determine one or more relevant images for an input text in a flashcard in accordance with one or more embodiments. For purposes of illustrating a clear example, FIG. 1 and FIG. 2 show specific configurations of components, but other configurations may be used in other embodiments. For example, components of FIG. 1 and FIG. 2 could be combined to create a single component or the functions of a single component could be implemented using two or more components.

Referring first to FIG. 1, in an embodiment, a distributed computer system organized as a flashcard learning system 100 is configured for analyzing text information in a question or prompt for a flashcard to determine one or more images that are semantically relevant to the input text. FIG. 1, the other drawing figures, and all the descriptions and claims in this disclosure are intended to present, disclose, and claim a wholly technical system with wholly technical elements that implement technical methods. In the disclosure, specially programmed computers, using a special-purpose distributed computer system design, execute functions that have not been available before in a new manner using instructions ordered in a new way to provide a practical application of computing technology to the technical problem of identifying one or more images which are semantically like the text information of an input question. Every step or operation that is functionally described in the disclosure is intended for implementation using programmed instructions that are executed by a computer. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In one embodiment, the flashcard learning system 100 is configured for analyzing text information in a flashcard 104 from a user device 102 for a user of interest, such as a student, over a telecommunication connection 110 that can traverse a network 120. In an embodiment, a text analyzer 130 is communicatively coupled to network 120 and to database 150. In particular, the flashcard 104 can include two sides of digital text data, such as a QWord 106 on the word side of the flashcard 104, a definition side text QDef 108 of the flashcard 104, or both as a Qterm. Qterm is a concatenation of QWord 106 and QDef 108 to combine the word side text and the definition side text of the flashcard. For example, the user can use the user device 102 to choose a flashcard 104, which includes a question as in an MCQ, which can be characterized by a Qword, such as "What is a Nucleoid?", a Qdef, such as "in prokaryotes, it is where the cell's DNA is stored, but it is not an enclosed organelle," or a Qterm, such as "What is a Nucleoid? in prokaryotes it is where the cell's DNA is stored, but it is not an enclosed organelle." The flashcard learning system 100 can be configured to pass the digital text data asynchronously through the text analyzer 130 to enable the text analyzer 130 to assess the input text data and determine one or more relevant images 140 which are semantically like the input text data.

For purposes of illustrating a clear example, FIG. 1 shows a user device 102 to provide a flashcard 104 on a single logical connection 110, but other embodiments can use any number of user devices to provide flashcards, and the present disclosure specifically contemplates executing with thousands of flashcards from the user devices 102 for the text analyzer 130 to determine one or more images for each of the provided flashcards.

Turning to FIG. 2, in one embodiment, a distributed computer system 200 comprises a user device 102 that is communicatively coupled to a text analyzer 130 over network 120. Network 120 broadly represents any combination of one or more data communication networks, including local area networks, wide area networks, internetworks, or the internet, using any wireline or wireless links, including terrestrial or satellite links. The network(s) may be implemented by any medium or mechanism that provides for the exchange of data between the various elements of FIG. 1. The various elements of FIG. 1 may also have direct (wired or wireless) communication links. The user device 102, the text analyzer 130, and other elements of the system may each comprise an interface compatible with the network 120 and may be programmed or configured to use standardized protocols for communication across the networks such as TCP/IP, Bluetooth, or higher-layer protocols such as HTTP, TLS, and the like.

In one embodiment, user device 102 may be a computer that includes hardware capable of communicatively coupling the device to one or more server computers, such as text analyzer 130, over one or more service providers. For example, user device 102 may include a network card that communicates with text analyzer 130 through a home or office wireless router (not illustrated in FIG. 1) that is communicatively coupled to an internet service provider. The user device 102 may be a smartphone, personal computer, tablet computing device, PDA, laptop, or any other computing device capable of transmitting and receiving information and performing the functions described herein.

In one embodiment, the user device 102 may comprise device memory 202, operating system 204, application program 206, and application extension 208. In one embodiment, user device 102 hosts and executes the application program 206, which the user device 102 may download and install from text analyzer 130, an application store, or another repository. The application program 206 is compatible with text analyzer 130 and may communicate with the text analyzer 130 using an app-specific protocol, parameterized HTTP POST and GET requests, and/or other programmatic calls. In some embodiments, application program 206 comprises a conventional internet browser application that can communicate over network 120 to other functional elements via HTTP and is capable of rendering dynamic or static HTML, XML, or other markup languages, including displaying text, images, accessing video windows and players, and so forth. In embodiments, text analyzer 130 may provide an application extension 208 for application program 206 through which the communication and other functionality may be implemented. In embodiments, a device display 280, such as a screen, may be coupled to the user device 102. For example, the application program 206 may be programmed to provide a text input in a query as a question in a flashcard for a user of interest in a learning mode. As another example, the application program 206 may be programmed to receive a text input in a query by a user from the device display 280 running on the user device 102. The text input can include a word side of the question, such as a Qword, or a definition side of the question, such as a Qdef, or both. The application program 206 may be programmed to send the received text input from the user device 102 in a query via network 120 to the text analyzer 130 as text data 232. For example, the text input may be any text string made up of one or more unigrams. As used herein, unigrams may be determined from words or groups of words, any part of speech, punctuation marks (e.g., "%"), colloquialisms (e.g., "move forward"), acronyms (e.g., "MCQ"), abbreviations (e.g., "ct."), exclamations ("ugh"), alphanumeric characters, symbols, written characters, accent marks, or any combination thereof. As another example, the text input may be an input Qword of "What is a Nucleoid?" which includes multiple unigrams, such as "What," "is," "a," "Nucleoid," and "?".

The text analyzer 130 may be implemented using a server-class computer or computer with one or more processor cores, co-processors, or other computers. The text analyzer 130 may be a physical server computer and/or virtual server instance stored in a data center, such as through cloud computing. In one embodiment, text analyzer 130 may be implemented using two or more processor cores, clusters, or instances of physical machines or virtual machines, configured in a discrete location, or co-located with other elements in a data center, shared computing facility, or cloud computing facility.

The text analyzer 130 is programmed to receive text data 232 from user device 102 and image data 234 from database 150. The image data 234 may include thousands of images with various topics, such as biology, medicine, science, languages, history, sports, arts and humanities, chemistry, etc. The image data 234 can come from a database 150, which stores millions of images from various public or private sources, such as a university, a company, or a public source. The text analyzer 130 may include a data processing module 236 and a text distractor manager 240 to assess the text data 232 and the image data 234. Specifically, the data processing module 236 may be programmed to use a natural language algorithm to assess the text data 232, which comprises one or more unigrams in a query from the user. The data processing module 236 can identify one or more unigrams in the text data 232, which can include various suitable text annotations, characters, symbols, letters, words, or any combination thereof. For example, when the text data 232 receives an input text query "What is a Nucleoid?" in a Qword, the data processing module 236 may identify the unigrams, such as "What," "is," "a," "Nucleoid," and "?", from the input text query. Likewise, each image in image data 234 is associated with a definition side text, including Qwords, Qdefs, and Qterms. In particular, the definition side text of each image in image data 234 includes one or more definition unigrams.

Furthermore, the data processing module 236 may be programmed to pre-process the image data 234 using various image analysis algorithms to improve the quality of the image, such noise attenuation, geometric rotation, interpolation, brightness correction, etc. For example, the data processing module 236 may apply a low pass filter to smooth an image by decreasing the disparity between pixel values by averaging nearby pixels. As another example, the data processing module 236 may apply an interpolation algorithm, such as linear interpolation or bicubic interpolation, to improve the brightness quality of an image.

The text analyzer 130 may comprise a text distractor manager 240 programmed to apply a machine learning algorithm 244 and a ranking algorithm 246 to train a machine learning model 242 by executing programmed ranking instructions 248 implementing the task to determine one or more relevant images which are semantically like the text data 232 and ranked by their image informativeness. In particular, the text distractor manager 240 can apply a dual encoder framework to generate the model to map the unigrams for the text input in the text data 232 to first vector representations and map the definition unigrams for an image to second vector representations for one or more images in the image data 234. For example, the dual encoder framework includes a text encoder, such as a one-dimensional convolutional neural network (CNN), a long short-term memory (LSTM) network, a gated recurrent units (GRUs) network, or a Bidirectional Encoder Representations from Transformers (BERT) network, to determine first vector representations associated with the input text based on the unigrams for text input in the text data 232. As another example, the dual encoder framework includes an image encoder, such as a residual network (ResNet) or a Visual Geometry Group (VGG) network, to determine second vector representations associated with an image input based on the definition unigrams for the image input in the image data 234. As a result, the text distractor manager 240 can apply the dual encoder framework to determine a first embedding, such as text embedding 252 of the first vector representations of the text input in a multi-dimensional embedding space based on a combination of the first vector representations of the text input. Likewise, the text distractor manager 240 can apply the dual encoder framework to determine a second embedding, such as image embedding 254 of the second vector representations of the image input in the multi-dimensional embedding space based on a combination of the second vector representations of the image input.

In particular, the text distractor manager 240 can calculate the second embedding of the image input by averaging the embeddings of its associated definition side text, such as Qwords, Qdefs, and Qterms. For example, an image in the image data 234 includes a definition side text with N different Qterms. The text distractor manager 240 can apply the dual encoder framework to determine an embedding in the multi-dimensional embedding space for each of the N Qterms associated with the image. As a result, the text distractor manager 240 can determine total N embeddings in the multi-dimensional embedding space for the image. The text distractor manager 240 can calculate the embedding for the image in the multi-dimensional embedding space by averaging the N embeddings for the N Qterms associated with the image. As another example, the text distractor manager 240 can determine the embedding for each image in the image data 234.

Furthermore, the machine learning algorithm 244 can include a ranking loss function based on a similarity score between the first embedding of the text input in the text data 232 and the second embedding of each image in the image data 234 in the multi-dimensional embedding space. The ranking loss function can be a contrastive loss function for a pair of inputs or a triplet loss function for three inputs. In particular, the ranking loss function can rank the images based on similarities between the first embedding of text data 232 and the second embedding of each image in the image data 234 in the multi-dimensional embedding space. For example, images in image data 234 that are relevant to the text input in text data 232 are closer in distance to the text input in the multi-dimensional embedding space than images in image data 234 that are irrelevant to the text input in the text data 232.

Furthermore, the text distractor manager 240 can apply an unsupervised machine learning algorithm, such as an approximate nearest neighbor search algorithm, to determine one or more relevant images 140. For example, based on the embeddings for the images in the image data 234 and the embedding for the text input in the text data 232, the text distractor manager 240 can apply an approximate nearest neighbor search algorithm to determine one or more embeddings associated with the one or more images in the image data 234 within a predetermined distance in the multi-dimensional embedding space from the embedding associated with the text input in the text data 232.

In one embodiment, text analyzer 130 is programmed to determine image informativeness 256 and confidence scores 258 associated with one or more relevant images 140. The text analyzer 130 can apply an optical character recognition (OCR) to convert the images of typed, handwritten or printed text into machine-encoded text for each of the one or more relevant images 140. For example, the text distractor manager 240 can be programmed to predict bounding box coordinates corresponding to text regions in each of the one or more relevant images 140. As another example, the text distractor manager 240 can be programmed to predict the text content within each bounding box with spelling correction. As a result, the text analyzer 130 can determine image informativeness 256 for each of the one or more relevant images 140 based on how many words are in the image.

In one embodiment, the text distractor manager 240 can determine a high image informativeness when the number of words in the image is larger than a predetermined image informativeness threshold, such as five words. Likewise, the text distractor manager 240 can determine a low image informativeness when the number of words in the image is smaller than the predetermined image informativeness threshold. For example, image data 234 contain one million images, among which 30% of the images have no recognizable text, and the remaining 70% of images contain 9.2 million words with an average of 13 words per image. In one experimental embodiment, the inventors found that 30% of the images of the recognized images had low image informativeness, and 70% of images of the recognized images had high image informativeness.

In one embodiment, the text distractor manager 240 can determine a confidence score of 258 for each word in one or more relevant images 140. The confidence score for a word in the image can be used to determine how accurately the word is recognized in the image. For example, a confidence score of "1.0" for the word "Capsule" indicates that the word "Capsule" has a very high overall accuracy of word recognition. As another example, a confidence score of "0.4817" for the word "Pili-" indicates that the word "Pili-" has a very low overall accuracy of word recognition. Thus, the text distractor manager 240 can apply spell correction to check the words with low confidence scores before a predetermined confidence threshold, such as a value of "0.8".

In one embodiment, text analyzer 130 may comprise ranking instructions 248 coupled to both machine learning models 242 and database 150. Database 150 may represent any memory accessible by the text analyzer 130, including a relational database, a data lake, cloud data storage, local hard drives, computer main memory, or any other form of electronic memory. In various embodiments, text analyzer 130 may store and execute sequences of programmed ranking instructions 248 of various types to cause execution of various methods. In example only, text analyzer 130 may execute the ranking instructions 248 in various programmed methods, but text analyzer 130 may also execute other types of programmed instructions in particular embodiments. The ranking instructions 248 may be executed by the text analyzer 130 to process or transform data, such as by executing a programmed machine learning model, or to cause data stored in database 150 to be transmitted to user device 102 over network 120. In various embodiments, presentation instructions 250 may be executed by text analyzer 130 to cause presentation in a display of a computing device communicating with text analyzer 130 over network 120 (such as user device 102) or to cause the transmission of display instructions to such a computing device, the display instructions formatted to cause such presentation upon execution.

The text analyzer 130 can be used in various learning modes to help a student to better engage with both the text information in a question and its associated images at the same time for word side study and definition side study. For example, when the student asks a question in flashcard mode, the text analyzer 130 can automatically provide a relevant image based on the words of the question. When the student gives an incorrect answer to a question in a learn-and-write mode, the text analyzer 130 can show a semantically relevant image based on the input text of the question to serve as "hints" that potentially increase the chance of the student's answer being correct next time. As another example, when the student can identify miss text by comparing a correct answer to an incorrect answer to the same question, the text analyzer 130 can show relevant images to explain the definition side of the missing text.

Each functional component of the flashcard learning system 100 can be implemented as software components, general or specific-purpose hardware components, firmware components, or any combination thereof. A storage component, such as database 150, can be implemented using relational databases, object databases, flat file systems, or JSON stores. A storage component can be connected to the functional components locally or through the networks using programmatic calls, remote procedure call (RPC) facilities, or a messaging bus. A component may or may not be self-contained. Depending upon implementation-specific or other considerations, the components may be centralized or distributed functionally or physically.

2.2 Training Machine Learning Models 2.2.1 a Dual Encoder

Figure 3:
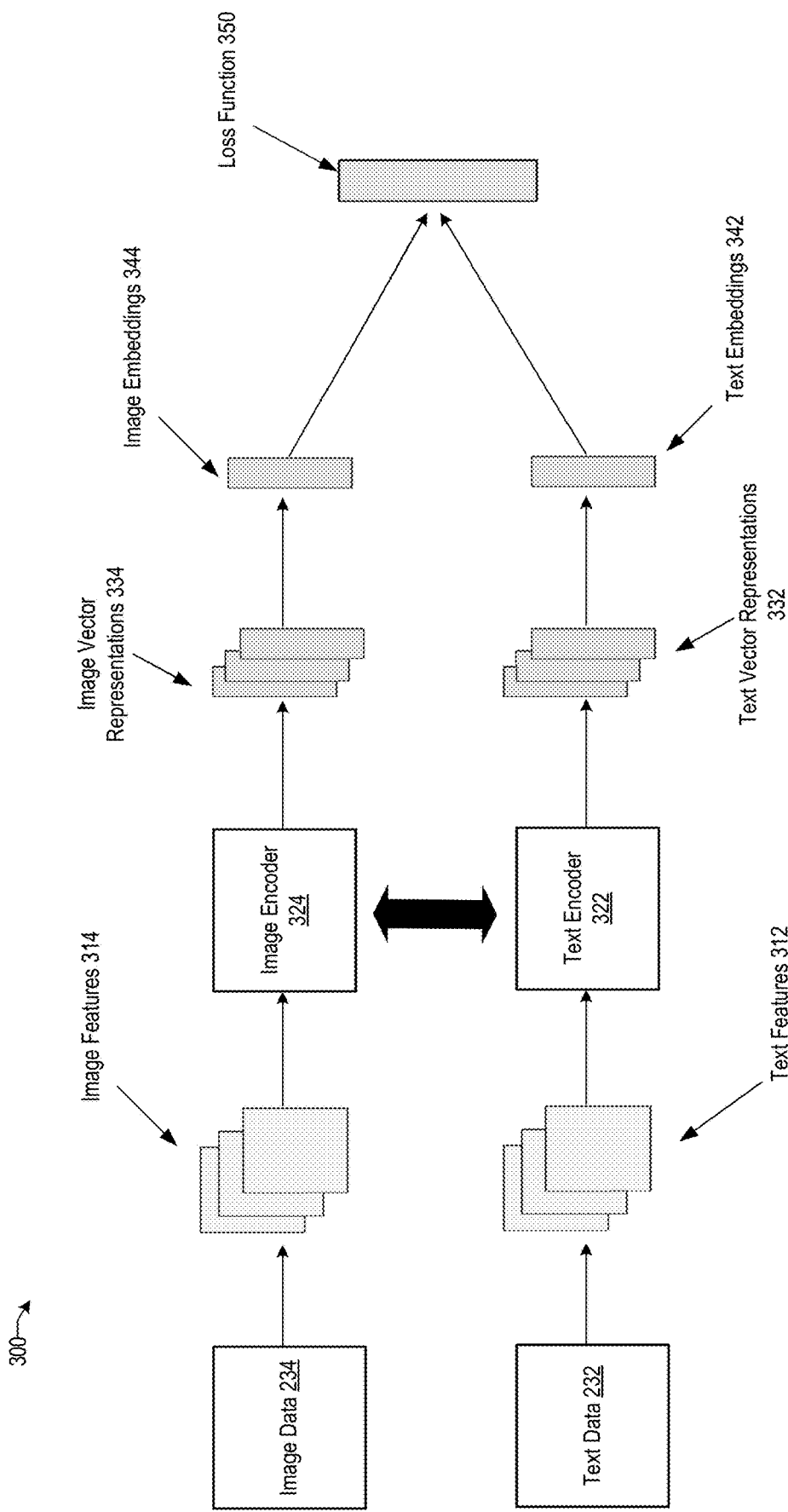
FIG. 3 shows an example of a dual encoder framework based on an image encoder and a text encoder in accordance with one or more embodiments.

FIG. 3 shows an example of a dual encoder framework 300 based on a text encoder 322 and an image encoder 324 in accordance with one or more embodiments. The machine learning model 242 can be a deep learning model trained using a dual encoder framework based on text data 232 and image data 234. The text data 232 can include a text input as a Qword, a Qdef, or a Qterm for an MCQ in a query from a user. The image data 234 can include a plurality of digital images. The text data 232 and the image data 234 can be encoded separately. For example, the text data 232 can comprise one or more first unigrams. As another example, each digital image in image data 234 can comprise one or more definition unigrams. The automated text distractor manager 240 can train a text encoder 322 to extract a plurality of text features 312 to determine a first embedding 342 based on the text data 232 as input. Likewise, the automated text distractor manager 240 can train an image encoder 324 to extract a plurality of image features 314 to determine a second embedding 344 based on the input image data 234. The text features 312 and image features 314 can include one or more first and second unigrams that are extracted from the text input of the text data 232 and the definition side of the image data 234, respectively. For example, the text side of the text data 232 includes one or more unigrams in a Qword, a Qdefs, or a Qterm to define a word side text of an MCQ in a flashcard. As another example, the definition side of the image data 234 can be identified as the top 10,000 most frequently occurring unigrams in Qterms containing images in a particular subject. Each image in the image data 234 can include one or more Qwords which are a combination of these identified unigrams. If a Qword has more than 500 definitions for an image, the automated text distractor manager 240 can pick the first 500 definitions for the image input to the image encoder 324.

Furthermore, the text encoder 322 and the image encoder 324 in the dual encoder framework can share weights of the machine learning model and provide aligned representations for text data 232 and image data 234. The automated text distractor manager 240 can apply the text encoder 322 to determine first vector representations, such as text vector representations 334 of the text input in the text data 232 by mapping the one or more first unigrams of the text input to the first vector representations for the text input. Likewise, the automated text distractor manager 240 can apply the image encoder 324 to determine second vector representations, such as image vector representations 332 of each of the plurality of images in the image data 234 by mapping the one or more definition unigrams of each of the plurality of images to the second vector representations for the plurality of images. The automated text distractor manager 240 can use the dual encoder framework 300 to determine the first embedding, such as text embedding 342 of the first vector representations of the text input in a multi-dimensional embedding space based on a combination of the first vector representations of the text input. The automated text distractor manager 240 can use the dual encoder framework 300 to determine the second embedding, such as image embedding 344 of the second vector representations of each of the plurality of images in a multi-dimensional embedding space based on a combination of the second vector representations of a corresponding image. The machine learning model 242 can include a loss function 350 based on the determined L-2 normalized text embedding 342 and image embedding 344. As a result, the dual encoder framework 300 can encode the text input and the image input independently to determine a cosine similarity score between the text input and image input for efficient image-text retrieval. For example, the cosine similarity score can be determined by a dot product of the text embedding 342 based on the text data 232 as input and the image embedding 344 based on the input image data 234.

2.2.2 A Contrastive Loss Function

Figure 4A:
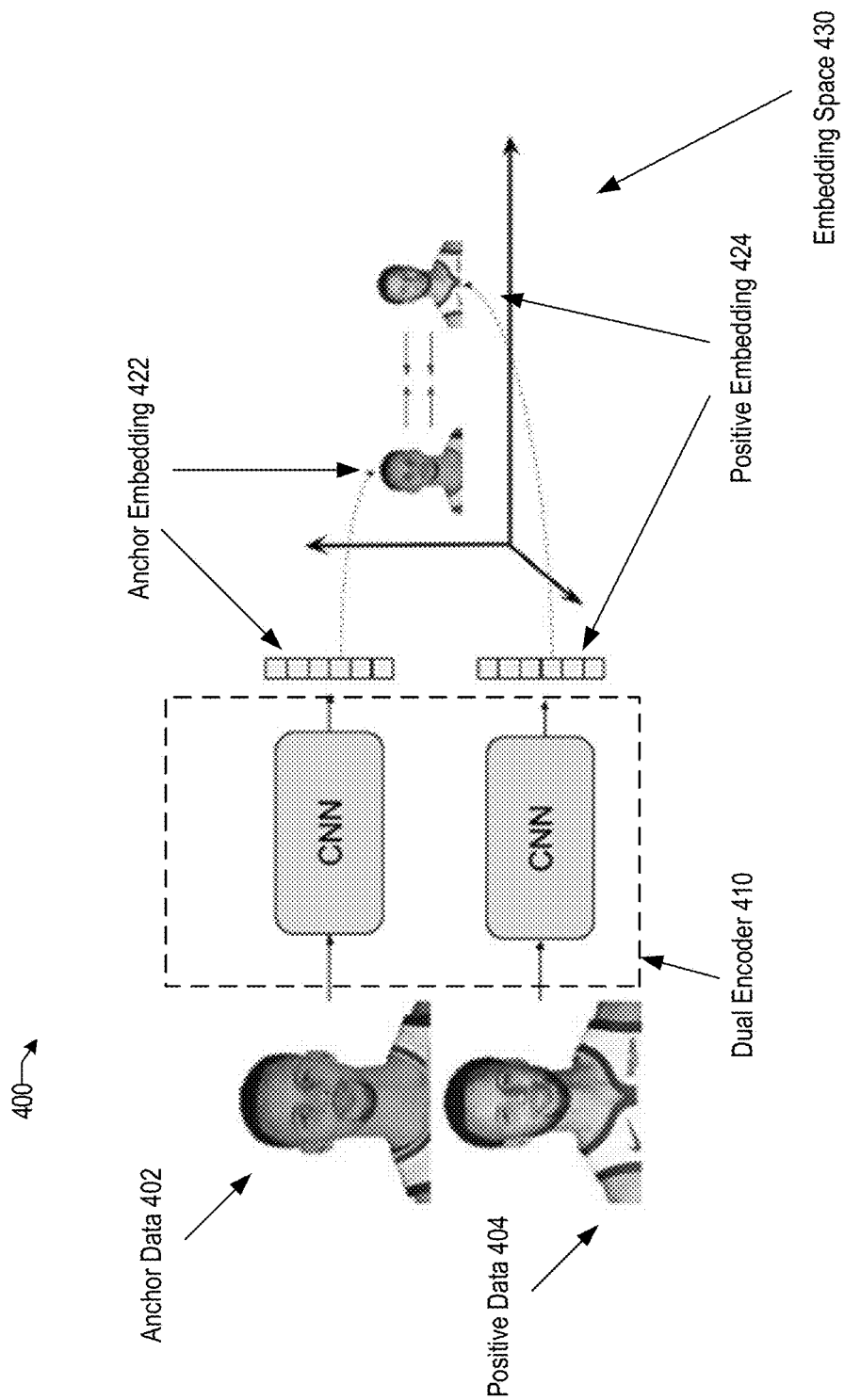
FIG. 4A and FIG. 4B show examples of a neural network based on a contrastive loss function in accordance with one or more embodiments.
Figure 4B:
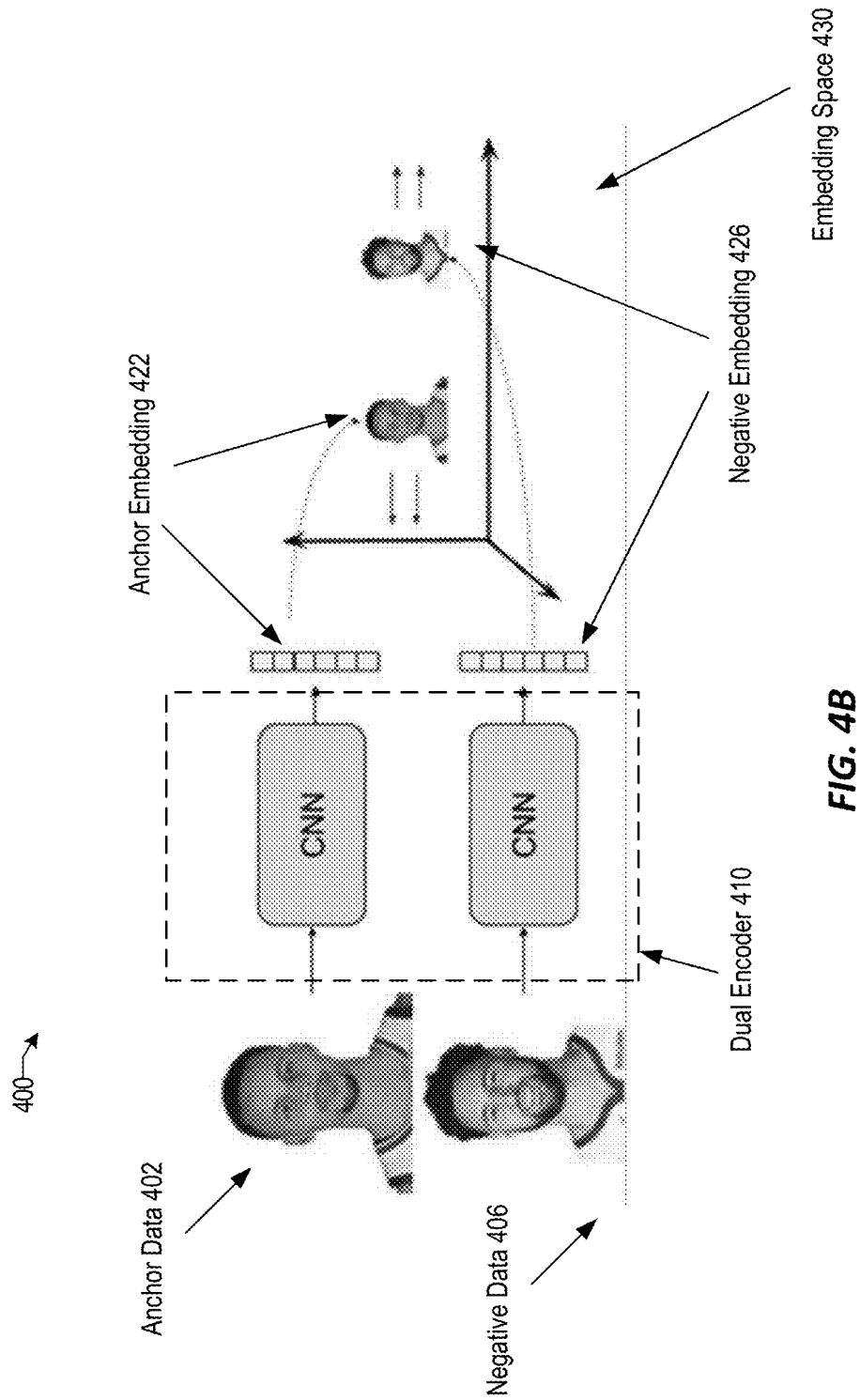

FIG. 4A, FIG. 4B show examples of a neural network 400 based on a contrastive loss function in accordance with one or more embodiments. FIG. 4A, FIG. 4B show that the neural network 400 includes two neural networks based on convolutional neural networks (CNNs) with shared weights for a positive pair of anchor data 402 and positive data 404 in FIG. 4A and a negative pair of anchor data 402 and negative data 406 in FIG. 4B. The anchor data 402 can include one or more images of a first basketball player. The positive data 404 can include one or more images of a second basketball player who looks like the first basketball player. The negative data 406 can include one or more images of a third basketball player who does not look like the first basketball player. The CNN includes a plurality of hidden layers, such as a convolutional layer, a pooling layer, a rectified linear unit (ReLU) layer, a softmax layer, a regressor layer, a dropout layer, and/or various other hidden layer types. These hidden layers can be arranged in any order that satisfies the input/output size criteria. Each layer comprises a set number of image filters. The output of filters from each layer is stacked together in the third dimension. This filter response stack then serves as the input to the next layer(s). The anchor data 402 is convolved with a set of learned filters, designed to highlight specific characteristics of the input data set to determine anchor embedding 422, positive embedding 424, and negative embedding 426 in a multi-dimensional embedding space 430.

Furthermore, the neural network 400 can include a contrastive loss function based on positive pairs and negative pairs. The neural network 400 can determine a loss function 350 based on equation 1 using a distance $d(r_a, r_p)$ between the anchor data 402 and the positive data 404, a distance $d(r_a, r_n)$ between the anchor data 402 and the negative data 406, and a margin m. The neural network 400 can adjust weights of the dual encoder 410 to minimize the distance $d(r_a, r_p)$ between the anchor data 402 and the positive data 404 and maximize the distance $d(r_a, r_n)$ between the anchor data 402 and the negative data 406 until the difference between $d(r_a, r_p)$ and $d(r_a, r_n)$ is greater than the margin m. The contrastive loss can represent the difference between the similarity between the positive pairs and the difference between the similarity between the negative pairs. The neural network 400 can perform iterative training to determine a model until a training stop condition is met.

$$L(r_a, r_p, r_n) = \begin{cases} d(r_a, r_p) & \text{if Positive Pairs} \\ \max\{0, m - d(r_a, r_n)\} & \text{if Negative Pairs} \end{cases} \quad \text{Equation 1}$$

where $L(r_a, r_p, r_n)$ is a contrastive loss for anchor data $r_a$, positive data $r_p$, and negative data $r_n$. $d(r_a, r_p)$ is a distance between the anchor data $r_a$ and the positive data $r_p$. $d(r_a, r_n)$ is a distance between the anchor data $r_a$ and the positive data $r_n$, m is a margin max $\{a, b\}$ is a function to output a is a is greater than b, otherwise output b.

2.2.3 a Triplet Loss Function

Figure 5:
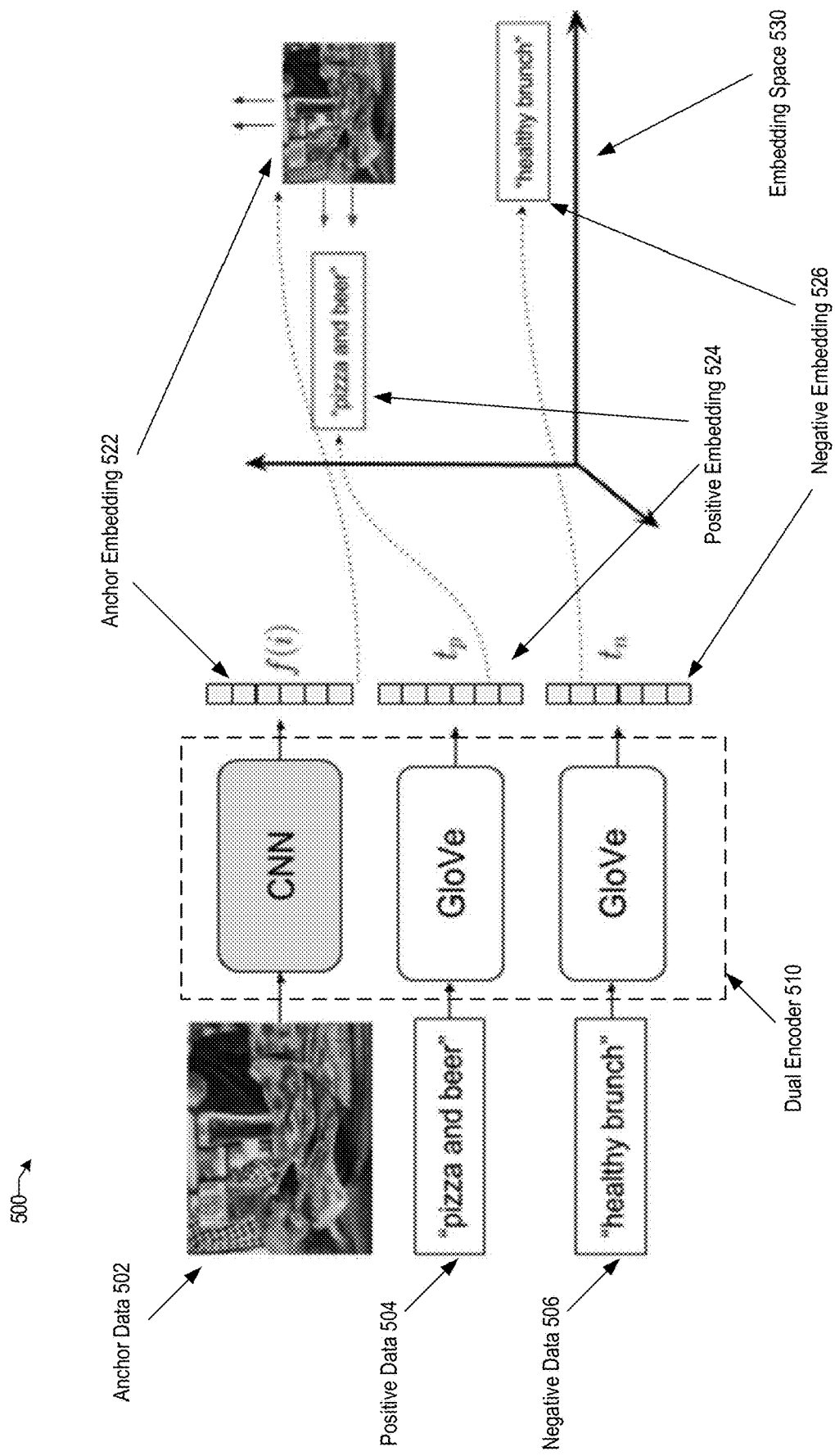
FIG. 5 shows an example of a neural network based on a triplet loss function in accordance with one or more embodiments.

FIG. 5 show an example of a neural network 500 based on a triplet loss function in accordance with one or more embodiments. For example, the neural network 500 includes three neural networks with shared weights: a convolutional neural network (CNN) for anchor data 502, a first Global Vectors for Word Representation network (GloVe) for the positive data 504, and a second GloVe network for the negative data 506. The anchor data 502 can include one or more images, such as a pizza image. The positive data 504 and the negative data 506 can include a text input, such as "pizza and beer" or "healthy brunch", which is semantically relevant or irrelevant to the anchor data 502. The anchor data 502 is convolved with a set of learned filters, designed to highlight specific characteristics of the input data set to determine anchor embedding 522 in a multi-dimensional embedding space 530.

Furthermore, the GloVe model is generated using an unsupervised machine learning algorithm for obtaining vector representations for words in the positive data 504 and the negative data 506. The GloVe model is derived by applying the unsupervised machine learning algorithm on aggregated global word-word co-occurrence statistics from training data, such the positive data 504 and the negative data 506. As a result, the automated text distractor manager 240 can apply the GloVe model to determine representations that are associated with linear substructures of the word vector space. For example, the automated text distractor manager 240 can apply the GloVe model to determine positive embedding 524 and negative embedding 526 using positive data 504 and negative data 506, respectively. The distance between the positive embedding 524 and the anchor embedding 522 is smaller than the distance between the negative embedding 526 and the anchor embedding 522, suggesting that the pizza image in the anchor data 502 is more relevant to the text "pizza and beer" in the positive data 504 compared to the text "healthy brunch" in the negative data 506. As a result, the neural network 500 can learn a similarity degree between two input data, such as a text input and an image, through network learning.

Furthermore, the neural network 500 can include a loss function based on triplets input. The neural network 500 can determine a triplet loss function 350 based on equation 2 using a distance $d(r_a, r_p)$ between the anchor data 502 and the positive data 504, a distance $d(r_a, r_n)$ between the anchor data 502 and the negative data 506, and a margin m. The neural network 500 can adjust weights of the dual encoder 510 to minimize the distance $d(r_a, r_p)$ between the anchor data 502 and the positive data 504 and maximize the distance $d(r_a, r_n)$ between the anchor data 502 and the negative data 506 until the difference between $d(r_a, r_p)$ and $d(r_a, r_n)$ is greater than the margin m. In particular, the triplet loss function 350 can be an easy triplet loss, a hard triplet loss, or a semi-hard triplet loss depending on where the negative data is relative to the anchor data and positive data. For example, an easy triplet loss has a loss of zero based on equation 4 because the sum of the distance $d(r_a, r_p)$ and the margin m is smaller than the distance $d(r_a, r_n)$ based on equation 3. The hard triplet loss has a loss larger than the margin m and zero based on equation 6 because the distance $d(r_a, r_p)$ is larger than the distance $d(r_a, r_n)$ based on equation 5. The semi-hard loss has a loss between 0 and the margin m based on equation 8 because the distance $d(r_a, r_n)$ is between the distance $d(r_a, r_p)$ and the sum of the distance $d(r_a, r_n)$ and the margin m based on equation 7. As a result, the triplet loss function 350 is determined by ensuring a margin m between distances of negative pairs and distances of positive pairs.

$$L(r_a, r_p, r_n) = \max\{0, m + d(r_a, r_p) - d(r_a, r_n)\} \quad \text{Equation 2}$$

$$d(r_a, r_n) > d(r_a, r_p) + m \quad \text{Equation 3}$$

$$L(r_a, r_p, r_n) = 0 \quad \text{Equation 4}$$

$$d(r_a, r_n) < d(r_a, r_p) \quad \text{Equation 5}$$

$$L(r_a, r_p, r_n) > 0 \text{ and } L(r_a, r_p, r_n) > m \quad \text{Equation 6}$$

$$d(r_a, r_p) < d(r_a, r_n) < d(r_a, r_p) + m \quad \text{Equation 7}$$

$$L(r_a, r_p, r_n) > 0 \text{ and } L(r_a, r_p, r_n) < m \quad \text{Equation 8}$$

where $L(r_a, r_p, r_n)$ is a triplet loss for anchor data $r_a$, positive data $r_p$, and negative data $r_n$. $d(r_a, r_p)$ is a distance between the anchor data $r_a$ and the positive data $r_p$. $d(r_a, r_n)$ is a distance between the anchor data $r_a$ and the positive data $r_n$, m is a margin. max $\{a, b\}$ is a function to output a is greater than b, otherwise output b.

2.3 Example Data Processing Flow

Figure 6A:
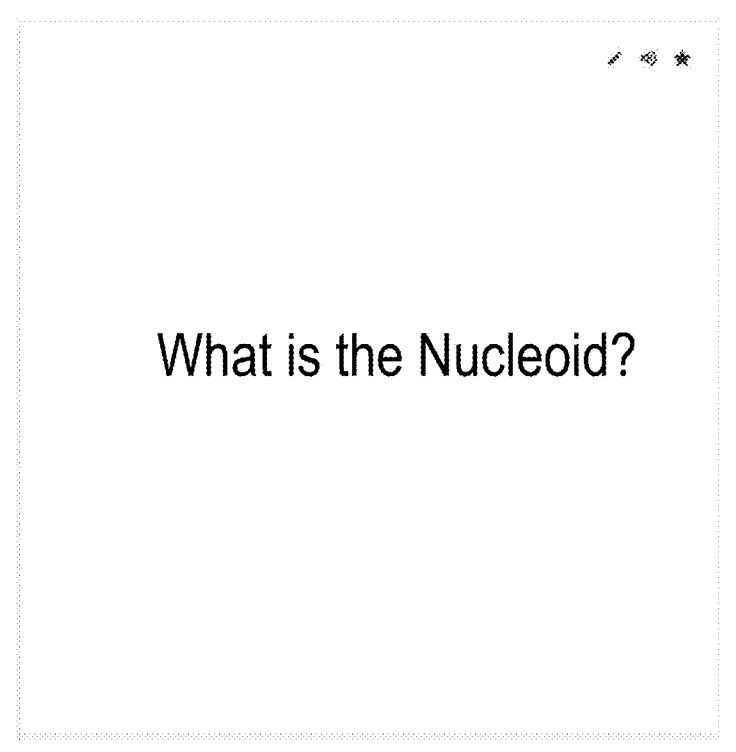
Figure 6C:
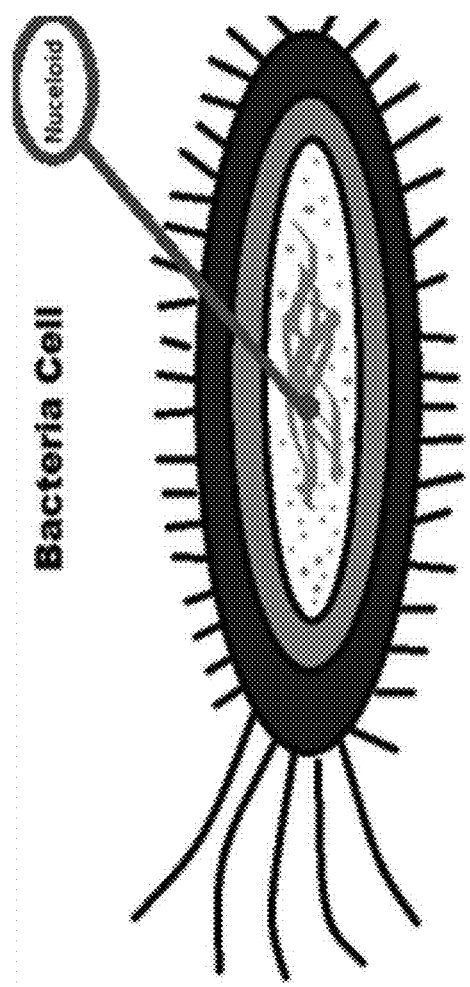
FIG. 6C shows an example of an image with low image informativeness in accordance with one or more embodiments.
Figure 6B:
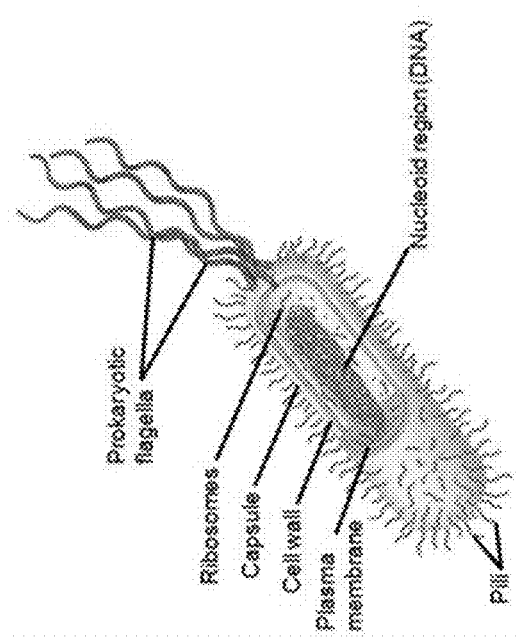
FIG. 6B shows an example of an image with high image informativeness in accordance with one or more embodiments.

FIG. 6A shows an example of text input in a flashcard in accordance with one or more embodiments. A user can use a flashcard model to study various MCQs via an interface on a user device 102. FIG. 6A shows the flashcard can include a Qword, such as "What is the Nucleoid?". The text analyzer 130 can access the Qword in the flashcard and determine two relevant images which are semantically similar to the Qword in the flashcard. In particular, the text analyzer 130 can find two relevant images with different image informativeness from a plurality of images stored in a database 150. Image informativeness is characterized by how many words in the Qword in the flashcard provided by the user. FIG. 6B shows an example of an image with high image informativeness in accordance with one or more embodiments. FIG. 6C shows an example of an image with low image informativeness in accordance with one or more embodiments. The user can use the two relevant images to study the selected MCQ in the flashcard based on personal requirements and education levels.

3. Procedural Over View

Figure 7:
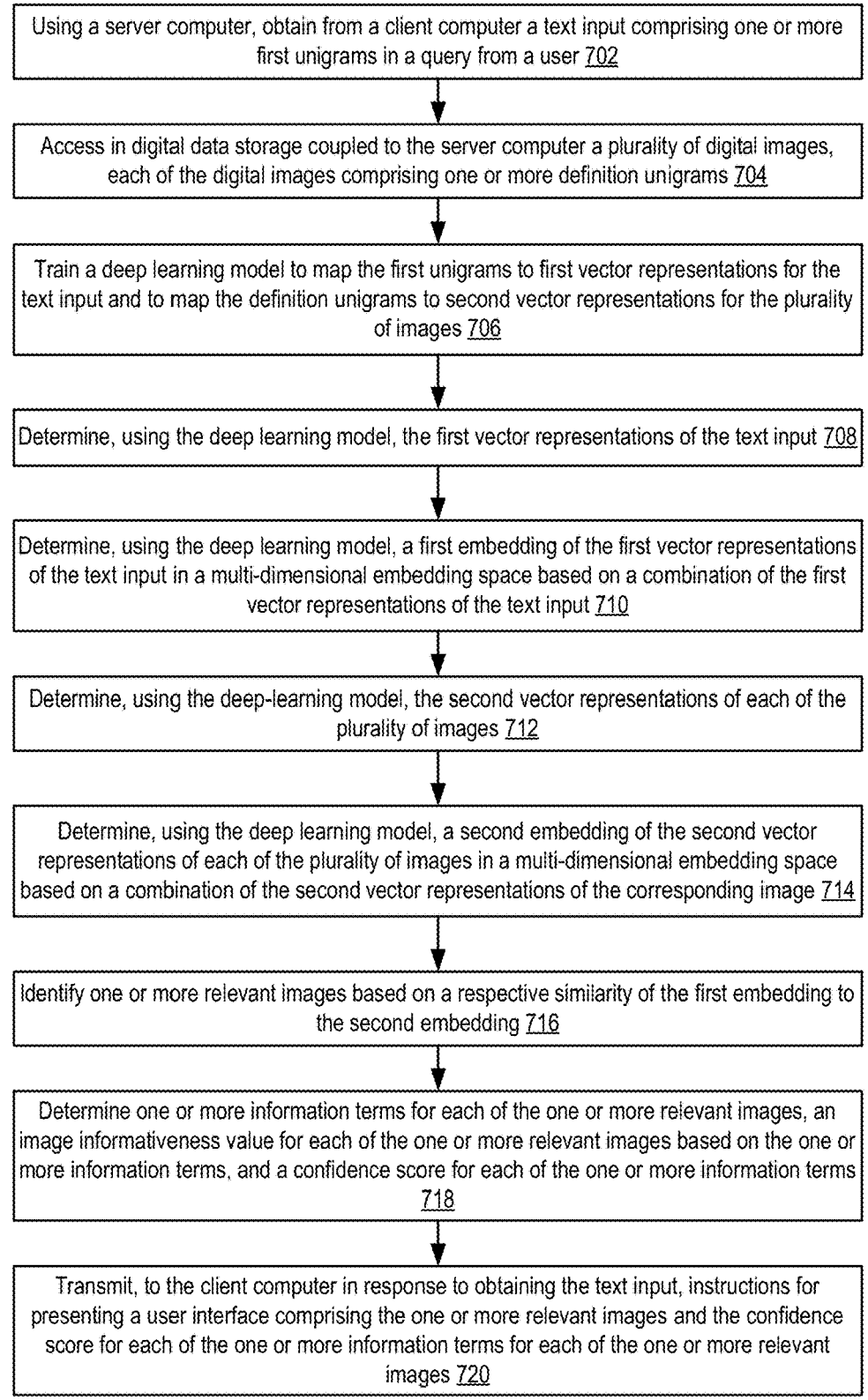
FIG. 7 shows a flow chart of a method of determining one or more relevant images based on a text input of a flashcard in accordance with one or more embodiments.

FIG. 7 shows a flow chart of a method 700 of determining one or more relevant images based on a text input of a flashcard in accordance with one or more embodiments. FIG. 7 can be programmed to implement a general workflow to apply a text analyzer 130 to assess the text input in a flashcard 104 for a user of interest. One or more blocks in FIG. 7 may be performed by one or more components as described in FIG. 1 and FIG. 2; for example, the text analyzer 130 can be programmed, using one or more sequences of instructions, to execute an implementation of FIG. 7. While the various blocks in FIG. 7 are presented and described sequentially, some or all the blocks may be executed in different orders, may be combined or omitted, and some or all the blocks may be executed in parallel. Furthermore, the blocks may be performed actively or passively.

FIG. 7 and each other flow diagram herein is intended as an illustration of the functional level at which skilled persons, in the art to which this disclosure pertains, communicate with one another to describe and implement algorithms using programming. The flow diagrams are not intended to illustrate every instruction, method, object, or sub-step that would be needed to program every aspect of a working program but are provided at the same functional level of illustration that is normally used at the high level of skill in this art to communicate the basis of developing working programs.

In Block 702, a text input comprising one or more first unigrams in a query is obtained using a server computer from a client computer from a user in accordance with one or more embodiments. For example, the user can use a flashcard learning system 100 to choose a flashcard with a text input for studying a question. The flashcard learning system 100 can receive the text input as a string for a word side definition of the question. The flashcard learning system 100 can convert the string of the text input using a natural language algorithm to the one or more first unigrams associated with the text input in the flashcard.

In Block 704, a plurality of digital images is accessed in digital data storage coupled to the server computer in accordance with one or more embodiments. Each of the plurality of digital images can comprise a plurality of definition words or terms that include one or more definition unigrams. For example, for each of the plurality of digital images, the flashcard learning system 100 can select top 500 definitions words or terms based on time spent studying the set containing those definition words or terms. As another example, the one or more definition unigrams are chosen from the top 10 thousand most frequently occurring unigrams for a particular subject, such Biology and Medicine.

In Block 706, a deep learning model is trained to map the first unigrams to first vector representations for the text input and to map the definition unigrams to second vector representations for the plurality of images in accordance with one or more embodiments. The text analyzer 130 may train a text encoder of the dual encoder to map the first unigrams to first vector representations for the text input. Likewise, the text analyzer 130 may train an image encoder to map the definition unigrams to second vector representations for the plurality of images. The text encoder and the image encoder in the dual encoder framework can share weights of the machine learning model and provide aligned representations for the text input and the plurality of images.

In Block 708, the first vector representations of the text input are determined using the deep learning model in accordance with one or more embodiments. The text analyzer 130 may use the dual encoder to determine the first vector representations of the text input. The first vector representation of the text input may correspond to coordinates of a point in a multi-dimensional embedding space.

In Block 710, a first embedding of the first vector representations of the text input is determined using the deep learning model in a multi-dimensional embedding space based on a combination of the first vector representations of the text input in accordance with one or more embodiments. The text analyzer 130 may calculate the first embedding of the first vector representations of the text input by averaging the first vector representations of the text input.

In Block 712, a second embedding of the second vector representations of each of the plurality of images is determined using the deep-learning model in accordance with one or more embodiments. The text analyzer 130 may calculate the second embedding of the second vector representations of each of the plurality of images by averaging the second vector representations of each of the plurality of images.

In Block 714, a second embedding of the second vector representations of each of the plurality of images is determined using the deep learning model in a multi-dimensional embedding space based on a combination of the second vector representations of the corresponding image in accordance with one or more embodiments. The text analyzer 130 may calculate the second embedding of each of the plurality of images by averaging the second vector representations of each of the plurality of images.

In Block 716, one or more relevant images are identified based on a respective similarity of the first embedding to the second embedding in accordance with one or more embodiments. The text analyzer 130 may calculate a cosine similarity score between the text input and each of the plurality of images based on the first embedding and the second embedding. In particular, the text analyzer 130 can use the cosine similarity score to retrieve one or more relevant images.

In Block 718, one or more information terms for each of the one or more relevant images, an image informativeness value for each of the one or more relevant images based on the one or more information terms, and a confidence score for each of the one or more information terms are determined in accordance with one or more embodiments. The text analyzer 130 may determine the information terms for each of the one or more relevant images using text detection, text recognition, and spelling correction. The text analyzer 130 may determine an image informativeness value for each of the one or more relevant images based on the information terms of each of the one or more relevant images. For each information term, the text analyzer 130 may calculate a confidence score to reflect how reliable the information term is retrieved from the corresponding image.

In Block 720, in response to obtaining the text input, instructions for presenting a user interface comprising the one or more relevant images and the confidence score for each of the one or more information terms for each of the one or more relevant images are transmitted to the client computer in accordance with one or more embodiments. A user can use the one or more relevant images to understand the question in the flashcard. Also, the user can use the relevant one or more images to find "hints" associated with a correction answer thus potentially increasing the chances of providing a correct answer to the question next time.

4. Implementation Example

Figure 8A:
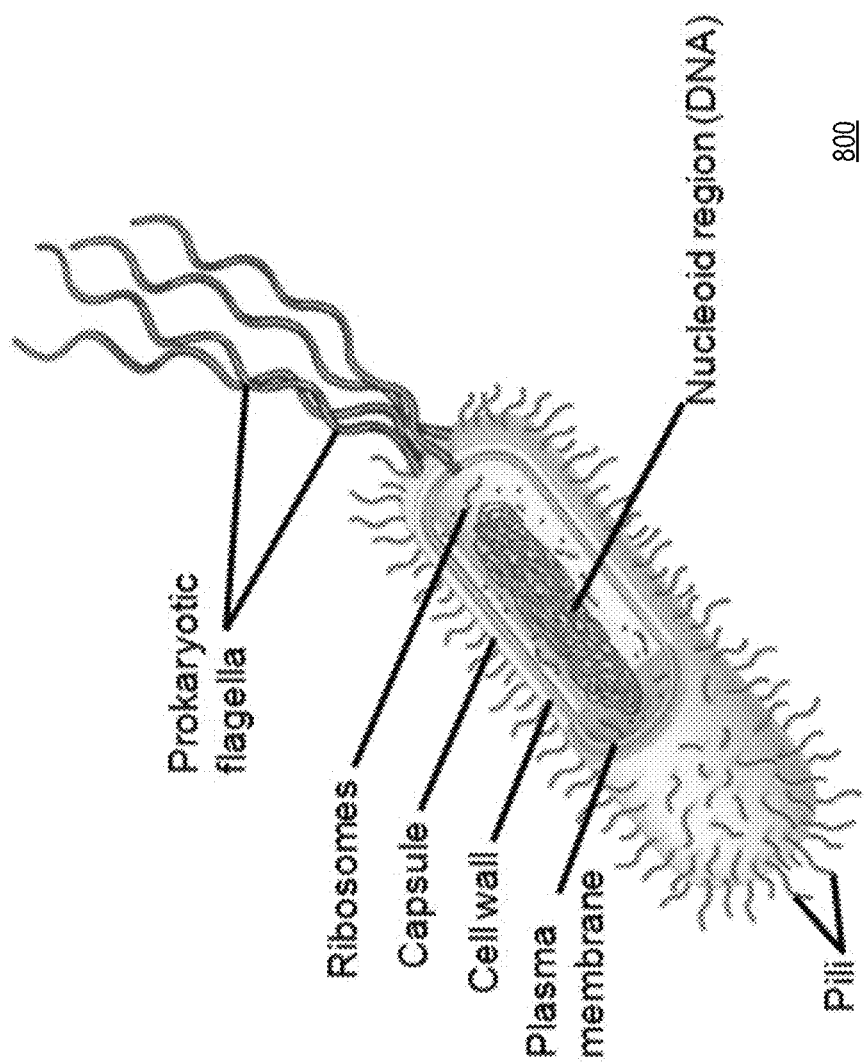
FIG. 8A, FIG. 8B, FIG. 8C show examples of identifying image informativeness for an image in accordance with one or more embodiments.
Figure 8B:
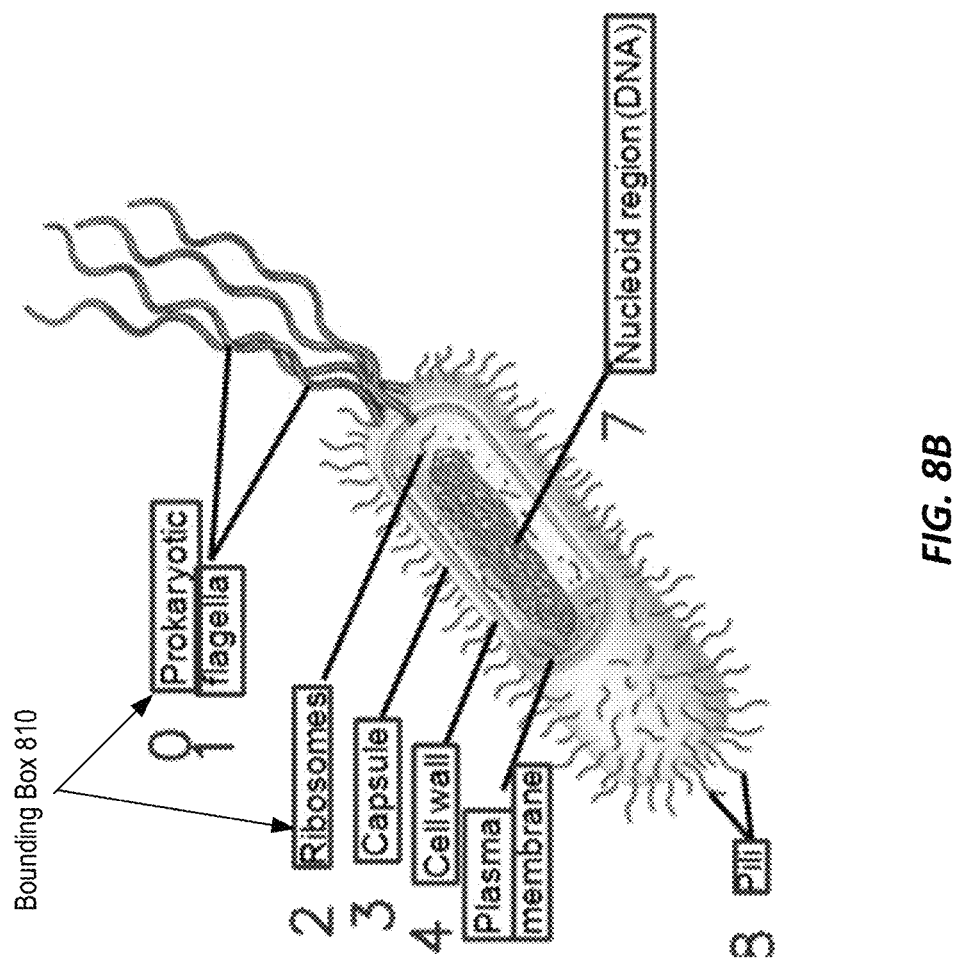
Figure 8C:
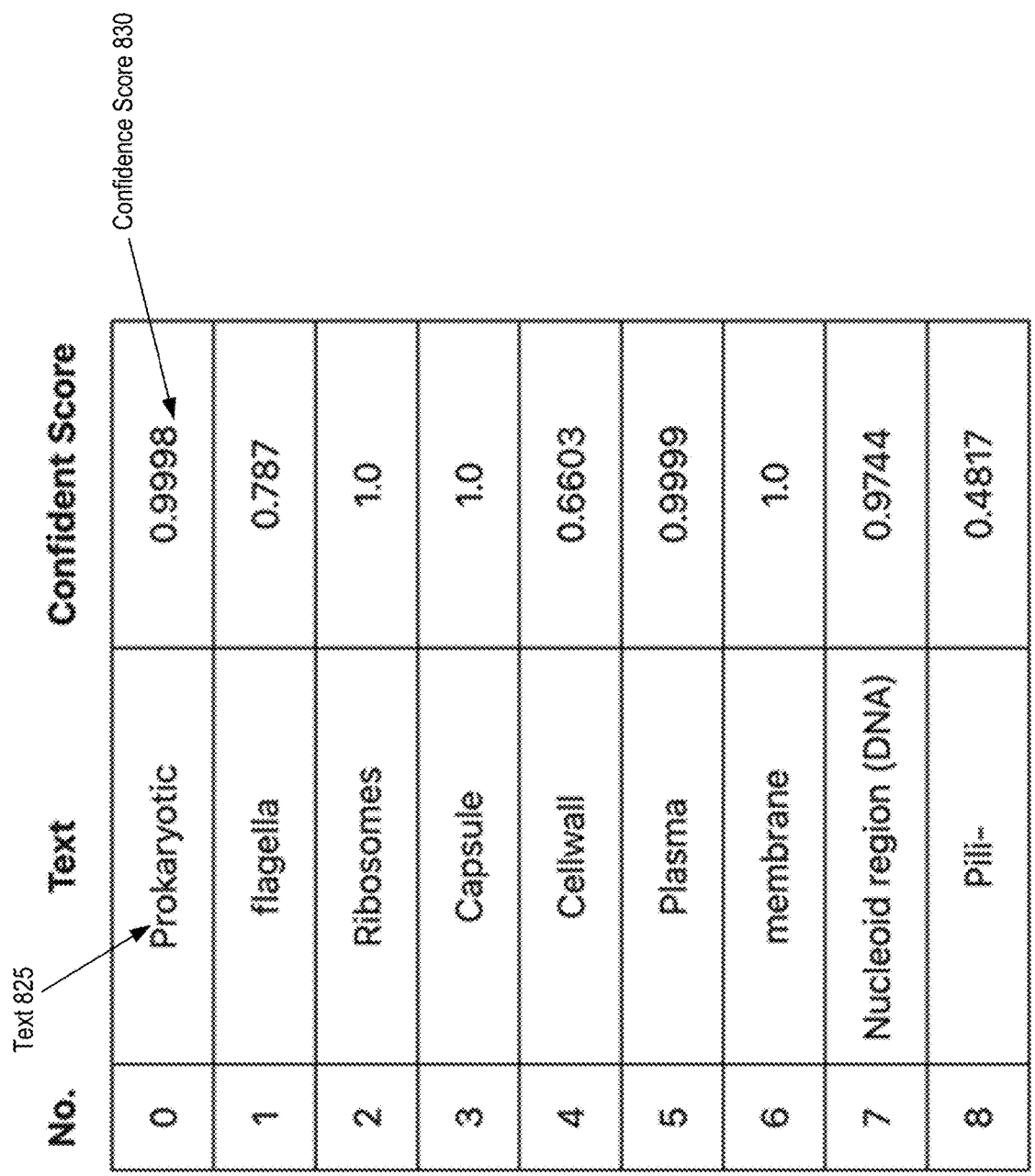

FIG. 8A, FIG. 8B, FIG. 8C show examples of identifying image informativeness for an image in accordance with one or more embodiments. In particular, the text analyzer 130 can apply an OCR to convert the identified relevant images of typed, handwritten, or printed text into machine-encoded text. In one embodiment, FIG. 8A shows an example of an image 800 of a nucleoid which is an irregularly shaped region within a prokaryotic cell as different parts of the cell are labelled in the image. The image informativeness value is defined by the number of words in the labels which provide critical information regarding the content of the image 800. For example, an image with a high number of words has a high image informativeness. As another example, an image with a low number of words has a low image informativeness. A user can choose to study a question using an image with low image informativeness because it is straightforward and easy to understand. Likewise, the user can choose to study a question using an image with high image informativeness because it is very informative, such as an image slide, with many words. The text analyzer 130 can assess image 800 using text detection to predict coordinates for a plurality of bounding boxes 810 corresponding to text regions in the image 800. For example, there are nine bounding boxes that can be identified for the text regions in image 800. Thus, the image 800 has an image informativeness value of "9". The text analyzer 130 can apply text recognition and spelling correction to determine text 825 and confidence score 830 for the text content within each of the bounding boxes 810. The confidence score 830 can be an indicator how accurate the text 825 is identified in the image 800. The user can use both the text 825 and the confidence score 830 to evaluate the OCR performance of the text analyzer 130. For example, the user can only use a text, such as the word "Ribosomes", with very high confidence score, such as "1.0", in the study.

5. Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 9:
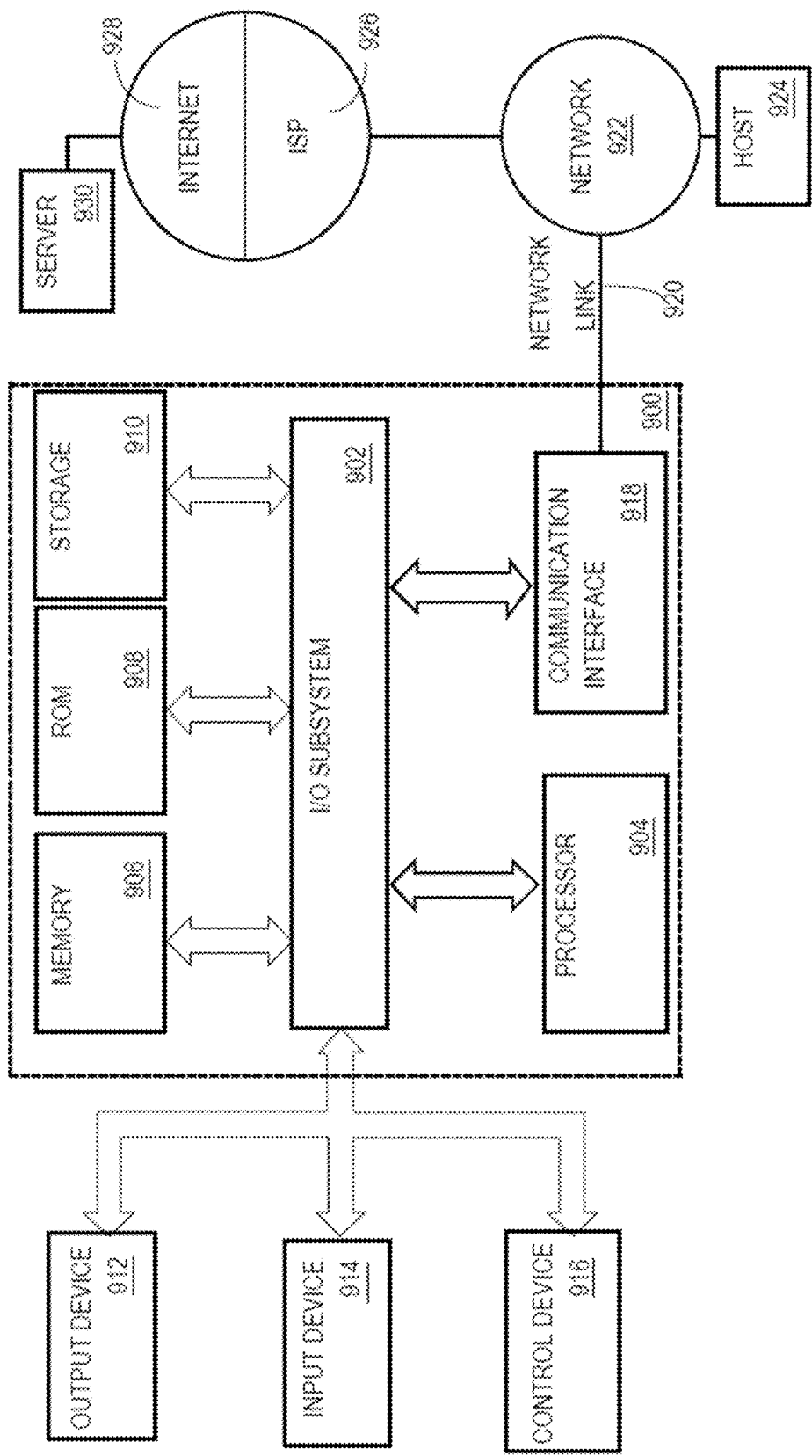
FIG. 9 illustrates a computer system in accordance with one or more embodiments.

FIG. 9 is a block diagram that illustrates an example computer system with which an embodiment may be implemented. In the example of FIG. 9, a computer system 900 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 900 includes an input/output (I/O) subsystem 902 which may include a bus and/or other communication mechanism(s) for communicating information and/or instructions between the components of the computer system 900 over electronic signal paths. The I/O subsystem 902 may include an I/O controller, a memory controller and at least one I/O port. The electronic signal paths are represented schematically in the drawings, for example as lines, unidirectional arrows, or bidirectional arrows.

At least one hardware processor 904 is coupled to I/O subsystem 902 for processing information and instructions. Hardware processor 904 may include, for example, a general-purpose microprocessor or microcontroller and/or a special-purpose microprocessor such as an embedded system or a graphics processing unit (GPU) or a digital signal processor or ARM processor. Processor 904 may comprise an integrated arithmetic logic unit (ALU) or may be coupled to a separate ALU.

Computer system 900 includes one or more units of memory 906, such as a main memory, which is coupled to I/O subsystem 902 for electronically digitally storing data and instructions to be executed by processor 904. Memory 906 may include volatile memory such as various forms of random-access memory (RAM) or other dynamic storage device. Memory 906 also may be used for storing temporary variables or other intermediate information during execution of instructions to be executed by processor 904. Such instructions, when stored in non-transitory computer-readable storage media accessible to processor 904, can render computer system 900 into a special-purpose machine that is customized to perform the operations specified in the instructions.

Computer system 900 further includes non-volatile memory such as read only memory (ROM) 908 or other static storage device coupled to I/O subsystem 902 for storing information and instructions for processor 904. The ROM 908 may include various forms of programmable ROM (PROM), such as erasable PROM (EPROM) or electrically erasable PROM (EEPROM). A unit of persistent storage 910 may include various forms of non-volatile RAM (NVRAM), such as FLASH memory, or solid-state storage, magnetic disk or optical disk such as CD-ROM or DVD-ROM and may be coupled to I/O subsystem 902 for storing information and instructions. Storage 910 is an example of a non-transitory computer-readable medium that may be used to store instructions and data which when executed by the processor 904 cause performing computer-implemented methods to execute the techniques herein.

The instructions in memory 906, ROM 908 or storage 910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 900 may be coupled via I/O subsystem 902 to at least one output device 912. In one embodiment, output device 912 is a digital computer display. Examples of a display that may be used in various embodiments include a touch screen display or a light-emitting diode (LED) display or a liquid crystal display (LCD) or an e-paper display. Computer system 900 may include other type(s) of output devices 912, alternatively or in addition to a display device. Examples of other output devices 912 include printers, ticket printers, plotters, projectors, sound cards or video cards, speakers, buzzers or piezoelectric devices or other audible devices, lamps or LED or LCD indicators, haptic devices, actuators or servos.

At least one input device 914 is coupled to I/O subsystem 902 for communicating signals, data, command selections or gestures to processor 904. Examples of input devices 914 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 916, which may perform cursor control or other automated control functions such as navigation in a graphical interface on a display screen, alternatively or in addition to input functions. Control device 916 may be a touchpad, a mouse, a trackball, or cursor direction keys for communicating direction information and command selections to processor 904 and for controlling cursor movement on an output device 912 such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 914 may include a combination of multiple different input devices, such as a video camera and a depth sensor.

In another embodiment, computer system 900 may comprise an internet of things (IoT) device in which one or more of the output device 912, input device 914, and control device 916 are omitted. Or, in such an embodiment, the input device 914 may comprise one or more cameras, motion detectors, thermometers, microphones, seismic detectors, other sensors or detectors, measurement devices or encoders and the output device 912 may comprise a special-purpose display such as a single-line LED or LCD display, one or more indicators, a display panel, a meter, a valve, a solenoid, an actuator or a servo.

When computer system 900 is a mobile computing device, input device 914 may comprise a global positioning system (GPS) receiver coupled to a GPS module that is capable of triangulating to a plurality of GPS satellites, determining and generating geo-location or position data such as latitude-longitude values for a geophysical location of the computer system 900. Output device 912 may include hardware, software, firmware and interfaces for generating position reporting packets, notifications, pulse or heartbeat signals, or other recurring data transmissions that specify a position of the computer system 900, alone or in combination with other application-specific data, directed toward host computer 924 or server computer 930.

Computer system 900 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 900 in response to processor 904 executing at least one sequence of at least one instruction contained in main memory 906. Such instructions may be read into main memory 906 from another storage medium, such as storage 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 910. Volatile media includes dynamic memory, such as memory 906. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 902. Transmission media can also take the form of acoustic or light waves, such as those generated during radio-wave and infra-red data communications.

Various forms of media may be involved in carrying at least one sequence of at least one instruction to processor 904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 900 can receive the data on the communication link and convert the data to a format that can be read by computer system 900. For instance, a receiver such as a radio frequency antenna or an infrared detector can receive the data carried in a wireless or optical signal and appropriate circuitry can provide the data to I/O subsystem 902 such as place the data on a bus. I/O subsystem 902 carries the data to memory 906, from which processor 904 retrieves and executes the instructions. The instructions received by memory 906 may optionally be stored on storage 910 either before or after execution by processor 904.

Computer system 900 also includes a communication interface 918 coupled to I/O subsystem 902. Communication interface 918 provides a two-way data communication coupling to network link(s) 920 that are directly or indirectly connected to at least one communication networks, such as a network 922 or a public or private cloud on the Internet. For example, communication interface 918 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 922 broadly represents a local area network (LAN), wide-area network (WAN), campus network, internetwork or any combination thereof. Communication interface 918 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 918 sends and receives electrical, electromagnetic or optical signals over signal paths that carry digital data streams representing various types of information.

Network link 920 typically provides electrical, electromagnetic, or optical data communication directly or through at least one network to other data devices, using, for example, satellite, cellular, Wi-Fi, or BLUETOOTH technology. For example, network link 920 may provide a connection through network 922 to a host computer 924.

Furthermore, network link 920 may provide a connection through network 922 or to other computing devices via internetworking devices and/or computers that are operated by an Internet Service Provider (ISP) 926. ISP 926 provides data communication services through a world-wide packet data communication network represented as internet 928. A server computer 930 may be coupled to internet 928. Server computer 930 broadly represents any computer, data center, virtual machine or virtual computing instance with or without a hypervisor, or computer executing a containerized program system such as DOCKER or KUBERNETES. Server computer 930 may represent an electronic digital service that is implemented using more than one computer or instance and that is accessed and used by transmitting web services requests, uniform resource locator (URL) strings with parameters in HTTP payloads, API calls, app services calls, or other service calls. Computer system 900 and server computer 930 may form elements of a distributed computing system that includes other computers, a processing cluster, server farm or other organization of computers that cooperate to perform tasks or execute applications or services. Server computer 930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 930 may comprise a web application server that hosts a presentation layer, application layer and data storage layer such as a relational database system using structured query language (SQL) or no SQL, an object store, a graph database, a flat file system or other data storage.

Computer system 900 can send messages and receive data and instructions, including program code, through the network(s), network link 920 and communication interface 918. In the Internet example, a server computer 930 might transmit a requested code for an application program through Internet 928, ISP 926, local network 922 and communication interface 918. The received code may be executed by processor 904 as it is received, and/or stored in storage 910, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 904. While each processor 904 or core of the processor executes a single task at a time, computer system 900 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   using a server computer, obtaining from a client computer a text input comprising one or more first unigrams in a query from a user;
   accessing in digital data storage coupled to the server computer a plurality of digital images, each of the plurality of digital images comprising one or more definition unigrams;
   training a deep learning model to map the one or more first unigrams to first vector representations for the text input and to map the one or more definition unigrams to second vector representations for the plurality of digital images, the deep learning model being a dual encoder model comprising a text encoder and an image encoder based on a ranking loss function;
   determining, using the deep learning model, the first vector representations of the text input by mapping the one or more first unigrams of the text input to the first vector representations for the text input;
   determining, using the deep learning model, a first embedding of the first vector representations of the text input in a multi-dimensional embedding space based on a combination of the first vector representations of the text input;
   determining, using the deep learning model, the second vector representations of each of the plurality of digital images by mapping the one or more definition unigrams of each of the plurality of digital images to the second vector representations for the plurality of digital images;
   determining, using the deep learning model, a second embedding of the second vector representations of each of the plurality of digital images in the multi-dimensional embedding space based on a combination of the second vector representations of a corresponding image;
   identifying one or more relevant images based on a respective similarity of the first embedding to the second embedding;
   determining one or more information terms for each of the one or more relevant images, an image informativeness value for each of the one or more relevant images based on the one or more information terms, and a confidence score for each of the one or more information terms; and
   transmitting, to the client computer in response to obtaining the text input, instructions for presenting a user interface comprising the one or more relevant images and the confidence score for each of the one or more information terms for each of the one or more relevant images.

2. The computer-implemented method of claim 1, wherein the text input includes a word side text.

3. The computer-implemented method of claim 2, wherein the text input includes at least one definition side associated with the word side text.

4. The computer-implemented method of claim 1, further comprising applying a machine learning algorithm and a negative data iterative training algorithm to train the deep learning model, wherein the machine learning algorithm uses a dual encoder which includes the text encoder and the image encoder.

5. The computer-implemented method of claim 1, wherein the ranking loss function is one selected from a group consisting of a triplet loss function and a contrastive loss function.

6. The computer-implemented method of claim 1, further comprising:
   averaging the first vector representations of the text input to determine the first embedding of the first vector representations of the text input in the multi-dimensional embedding space; and
   averaging the second vector representations of each of the plurality of digital images to determine the second embedding of the second vector representations of the corresponding image in the multi-dimensional embedding space.

7. The computer-implemented method of claim 1, further comprising:
   determining coordinates for one or more bounding boxes corresponding to text regions for each of the one or more relevant images;
   determining a text content within each of the one or more bounding boxes based on the coordinates for each of the one or more bounding boxes; and
   applying spelling correction to the text content within each of the one or more bounding boxes.

8. The computer-implemented method of claim 1, further comprising identifying a high informative image from the one or more relevant images using the image informativeness value for each of the one or more relevant images, and identifying a low informative image from the one or more relevant images using the image informativeness value for each of the one or more relevant images.

9. The computer-implemented method of claim 8, wherein the high informative image from the one or more relevant images is defined as one of the one or more relevant images with a most number of words and below a predetermined word limit.

10. The computer-implemented method of claim 8, wherein the low informative image from the one or more relevant images is defined as one of the one or more relevant images with a least number of words and below a predetermined word limit.

11. A computer system, comprising:
one or more processors; and
a memory coupled to the one or more processors comprising instructions executable by the one or more processors, the one or more processors operable when executing the instructions to:
using a server computer, obtain from a client computer a text input comprising one or more first unigrams in a query from a user;
access in digital data storage coupled to the server computer a plurality of digital images, each of the plurality of digital images comprising one or more definition unigrams;
train a deep learning model to map the one or more first unigrams to first vector representations for the text input and to map the one or more definition unigrams to second vector representations for the plurality of digital images, the deep learning model being a dual encoder model comprising a text encoder and an image encoder based on a ranking loss function;
determine, using the deep learning model, the first vector representations of the text input by mapping the one or more first unigrams of the text input to the first vector representations for the text input;
determine, using the deep learning model, a first embedding of the first vector representations of the text input in a multi-dimensional embedding space based on a combination of the first vector representations of the text input;
determine, using the deep learning model, the second vector representations of each of the plurality of digital images by mapping the one or more definition unigrams of each of the plurality of digital images to the second vector representations for the plurality of digital images;
determine, using the deep learning model, a second embedding of the second vector representations of each of the plurality of digital images in the multi-dimensional embedding space based on a combination of the second vector representations of a corresponding image;
identify one or more relevant images based on a respective similarity of the first embedding to the second embedding;
determine one or more information terms for each of the one or more relevant images, an image informativeness value for each of the one or more relevant images based on the one or more information terms, and a confidence score for each of the one or more information terms; and transmit, to the client computer in response to obtaining the text input, instructions for presenting a user interface comprising the one or more relevant images and the confidence score for each of the one or more information terms for each of the one or more relevant images.

12. The computer system of claim 11, wherein the text input includes a word side text.

13. The computer system of claim 11, wherein the text input includes at least one definition side associated with a word side text.

14. The computer system of claim 11, wherein the one or more processors are operable when executing the instructions to apply a machine learning algorithm and a negative data iterative training algorithm to train the deep learning model, wherein the machine learning algorithm uses a dual encoder which includes the text encoder and the image encoder.

15. The computer system of claim 11, wherein the ranking loss function is one selected from a group consisting of a triplet loss function and a contrastive loss function.

16. The computer system of claim 11, wherein the one or more processors are operable when executing the instructions to:
average the first vector representations of the text input to determine the first embedding of the first vector representations of the text input in the multi-dimensional embedding space; and
average the second vector representations of each of the plurality of digital images to determine the first embedding of the second vector representations of the corresponding image in the multi-dimensional embedding space.

17. The computer system of claim 11, wherein the one or more processors are operable when executing the instructions to:
determine coordinates for one or more bounding boxes corresponding to text regions for each of the one or more relevant images;
determine a text content within each of the one or more bounding boxes based on the coordinates for each of the one or more bounding boxes; and
apply spelling correction to the text content within each of the one or more bounding boxes.

18. The computer system of claim 11, wherein the one or more processors are operable when executing the instructions to:
identify a high informative image using the image informativeness value for each of the one or more relevant images, and
identify a low informative image using the image informativeness value for each of the one or more relevant images.

19. The computer system of claim 18, wherein the high informative image from the one or more relevant images is defined as one of the one or more relevant images with a most number of words and below a predetermined word limit, and wherein the low informative image from the one or more relevant images is defined as one of the one or more relevant images with a least number of words and below a predetermined word limit.

20. One or more non-transitory computer-readable storage media storing one or more sequences of instructions which, when executed using one or more processors, cause the one or more processors to execute:

using a server computer, obtain from a client computer a text input comprising one or more first unigrams in a query from a user;

access in digital data storage coupled to the server computer a plurality of digital images, each of the plurality of digital images comprising one or more definition unigrams;

train a deep learning model to map the one or more first unigrams to first vector representations for the text input and to map the one or more definition unigrams to second vector representations for the plurality of digital images, the deep learning model being a dual encoder model comprising a text encoder and an image encoder based on a ranking loss function;

determine, using the deep learning model, the first vector representations of the text input by mapping the one or more first unigrams of the text input to the first vector representations for the text input;

determine, using the deep learning model, a first embedding of the first vector representations of the text input in a multi-dimensional embedding space based on a combination of the first vector representations of the text input;

determine, using the deep learning model, the second vector representations of each of the plurality of digital images by mapping the one or more definition unigrams of each of the plurality of digital images to the second vector representations for the plurality of digital images;

determine, using the deep learning model, a second embedding of the second vector representations of each of the plurality of digital images in the multi-dimensional embedding space based on a combination of the second vector representations of a corresponding image;

identify one or more relevant images based on a respective similarity of the first embedding to the second embedding;

determine one or more information terms for each of the one or more relevant images, an image informativeness value for each of the one or more relevant images based on the one or more information terms, and a confidence score for each of the one or more information terms; and transmit, to the client computer in response to obtaining the text input, instructions for presenting a user interface comprising the one or more relevant images and the confidence score for each of the one or more information terms for each of the one or more relevant images.

* * * * *